(12) United States Patent
Höerold et al.

(10) Patent No.: US 10,941,281 B2
(45) Date of Patent: Mar. 9, 2021

(54) FLAME-RETARDANT POLYAMIDE COMPOSITION

(71) Applicant: CLARIANT PLASTICS & COATINGS LTD, Muttenz (CH)

(72) Inventors: Sebastian Höerold, Diedorf (DE); Elke Schlosser, Augsburg (DE)

(73) Assignee: Clariant Plastics & Coatings Ltd, Muttenz (CH)

( * ) Notice: Subject to any disclaimer, the term of this patent is extended or adjusted under 35 U.S.C. 154(b) by 86 days.

(21) Appl. No.: 15/565,618

(22) PCT Filed: Apr. 4, 2016

(86) PCT No.: PCT/EP2016/057310
§ 371 (c)(1),
(2) Date: Oct. 10, 2017

(87) PCT Pub. No.: WO2016/165964
PCT Pub. Date: Oct. 20, 2016

(65) Prior Publication Data
US 2018/0072873 A1    Mar. 15, 2018

(30) Foreign Application Priority Data
Apr. 13, 2015 (DE) .................. 10 2015 004 661

(51) Int. Cl.
| | | |
|---|---|---|
| *C08K 13/04* | (2006.01) | |
| *C09K 21/12* | (2006.01) | |
| *C08K 5/5313* | (2006.01) | |
| *C08K 5/5317* | (2006.01) | |
| *C08K 5/5399* | (2006.01) | |

(52) U.S. Cl.
CPC ............ *C08K 13/04* (2013.01); *C08K 5/5313* (2013.01); *C08K 5/5317* (2013.01); *C08K 5/5399* (2013.01); *C09K 21/12* (2013.01)

(58) Field of Classification Search
CPC ..... C08L 77/00; C08K 5/5313; C08K 5/5317; C08K 5/5399; C08K 5/0066; C08K 13/04; C09K 21/12
See application file for complete search history.

(56) References Cited

U.S. PATENT DOCUMENTS

| | | |
|---|---|---|
| 3,900,444 A | 8/1975 | Racky et al. |
| 4,036,811 A | 7/1977 | Noetzel et al. |
| 6,207,736 B1 | 3/2001 | Nass et al. |
| 6,509,401 B1 | 1/2003 | Jenewein et al. |
| 6,518,336 B1 | 2/2003 | Yabuhara et al. |

(Continued)

FOREIGN PATENT DOCUMENTS

| | | |
|---|---|---|
| DE | 2252258 A1 | 5/1974 |
| DE | 2447727 A1 | 4/1976 |

(Continued)

OTHER PUBLICATIONS

International Search Report issued in corresponding International Patent Application No. PCT/EP2016/057310 dated Jun. 21, 2016.

(Continued)

*Primary Examiner* — Monique R Peets
(74) *Attorney, Agent, or Firm* — Morgan, Lewis & Bockius LLP

(57) ABSTRACT

The invention relates to a flame-retardant polyamide composition comprising as component A) 1 to 96 wt % of one or more thermoplastic polyamides, as component B) 2 to 25 wt % of a dialkylphosphinic salt of the formula (I), and/or of a diphosphinic salt of the formula (II), and/or of polymers thereof,

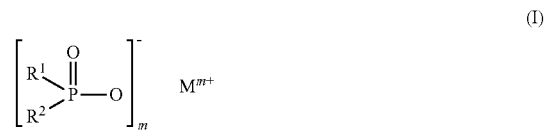

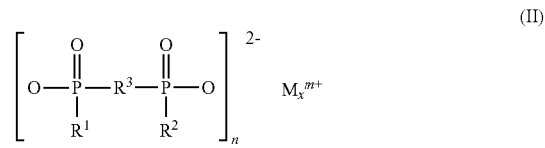

in which
$R^1$ and $R^2$ are identical or different and are $C_1$-$C_6$-alkyl, linear, or branched, or H;
$R^3$ is $C_1$-$C_{10}$-alkylene, linear, or branched, $C_6$-$C_{10}$-arylene, $C_7$-$C_{20}$-alkylarylene, or $C_7$-$C_{20}$-arylalkylene;
M is Mg, Ca, Al, Sb, Sn, Ge, Ti, Zn, Fe, Zr, Ce, Bi, Sr, Mn, Li, Na, K and/or a protonated nitrogen base;
m is 1 to 4;
n is 1 to 4;
x is 1 to 4,
as component C) 1 to 20 wt % of a salt of phosphorous acid,
as component D) 1 to 20 wt % of a phosphazene,
as component E) 0 to 50 wt % of filler or reinforcing agent,
as component F) 0 to 1 wt % of a phosphonite or of a mixture of a phosphonite and a phosphite, and
as component G) 0 to 1 wt % of an ester or salt of long-chain aliphatic carboxylic acids (fatty acids), which typically have chain lengths of $C_{14}$ to $C_{40}$, the sum of the components always being 100 wt %.

19 Claims, No Drawings

(56) References Cited

U.S. PATENT DOCUMENTS

| | | | |
|---|---|---|---|
| 6,521,689 B1 | 2/2003 | Yabuhara et al. | |
| 2007/0072967 A1* | 3/2007 | Nass | C08K 5/5313 |
| | | | 524/100 |
| 2010/0069539 A1* | 3/2010 | Morimoto | C07F 9/067 |
| | | | 524/100 |
| 2010/0261818 A1 | 10/2010 | Seki | |
| 2013/0190432 A1* | 7/2013 | Krause | C08K 5/0008 |
| | | | 524/101 |
| 2014/0073724 A1* | 3/2014 | Zheng | C08G 69/36 |
| | | | 524/100 |
| 2015/0376377 A1* | 12/2015 | Mii | C08K 3/22 |
| | | | 524/607 |

FOREIGN PATENT DOCUMENTS

| | | |
|---|---|---|
| DE | 19734437 A1 | 2/1999 |
| DE | 19737727 A1 | 7/1999 |
| DE | 69907251 T2 | 2/2004 |
| DE | 60011058 T2 | 6/2005 |
| EP | 0024167 A2 | 2/1981 |
| JP | 2007138151 A1 | 6/2007 |
| JP | 2010024324 A1 | 2/2010 |
| WO | 97/01664 A1 | 1/1997 |
| WO | 2002/028953 A1 | 4/2002 |
| WO | 2004/016684 A1 | 2/2004 |
| WO | 2004/022640 A1 | 3/2004 |
| WO | 2009/037859 A1 | 3/2009 |
| WO | 2012/055532 A1 | 5/2012 |
| WO | 2014/135256 A1 | 9/2014 |

OTHER PUBLICATIONS

Written Opinion issued in corresponding International Patent Application No. PCT/EP2016/057310 dated Jun. 21, 2016.

* cited by examiner

FLAME-RETARDANT POLYAMIDE COMPOSITION

The present invention relates to a flame-retardant polyamide composition and to moldings which comprise this flame-retardant polyamide composition.

Many plastics have a chemical composition which renders them easily combustible. In order to be able to meet the exacting flame retardancy requirements called for by plastics processors and to some extent by the legislator, plastics must generally be furnished with flame retardants. Known for this purpose, and commercially available as well, are a host of different flame retardants and flame retardant synergists. On account of the more advantageous side-effects in case of fire, in terms of smoke gas density and smoke gas composition, and also on environmental grounds, there has for some time been a preference for using nonhalogenated flame retardant systems.

Among the nonhalogenated flame retardants, particularly for thermoplastic polymers, the salts of phosphinic acids (phosphinates) have proven particularly effective (DE-A-2252258 and DE-A-2447727). A number of derivatives from this class of flame retardant are valued and used accordingly for their low adverse effect on the mechanical properties of the thermoplastic molding compounds.

Furthermore, synergistic combinations of phosphinates with certain nitrogen-containing compounds, more particularly with melamine derivatives, have been found, which across a whole range of polymers act more effectively as flame retardants than do the phosphinates alone (WO-A-2002/28953, WO-A-97/01664, and also DE-A-19734437 and DE-A-19737727).

It has further been found that the flame retardancy effect of the various phosphinates in thermoplastic polymers can also be significantly improved by additions of small amounts of inorganic or mineral compounds that contain no nitrogen, and that the stated additions may also enhance the flame retardancy effect of phosphinates in combination with nitrogen-containing synergists (EP-A-0024167, WO-A-2004/016684).

When phosphinate-containing flame retardant systems have been used, especially at processing temperatures above 300° C., there were initially partial polymer degradation, incidences of discoloration of the polymer, and evolution of smoke during processing. These difficulties, however, were mitigated by addition of basic or amphoteric oxides, hydroxides, carbonates, silicates, borates, or stannates (WO-A-2004/022640).

Compounds described for the flame retardancy furnishing of polymers have included not only phosphinates but also phosphazenes. Thus WO-A-2009/037859 describes flame-retardant polyamides comprising 20-80 wt % of polyamide, 5-30 wt % of a phosphinate compound, and 0.01-10 wt % of a phosphazene compound. These polyamides are semiaromatic polyamides, the melting points lying between 280 and 340° C. Fillers and reinforcing agents, and also further additives, may likewise be used.

DE-A-60011058 describes flame-retardant aromatic polyamides comprising 100 parts by weight of an aromatic polyamide resin, 0.1-100 parts by weight of a crosslinked phosphazene compound, 1-60 parts by weight of an inorganic, fibrous substance, and 1-60 parts by weight of magnesium hydroxide.

JP-A-2007-138151 describes flame-retardant polyamides comprising phosphazenes. Phosphinates are mentioned as further flame retardants; in the examples, in polyamide 66, phosphazene is combined with melamine cyanurate and with a phenolic resin as ash-former. Without addition of PTFE, V-0 is not attained. Disadvantages of the addition of phenolic resins, however, are usually discolorations. There are no mentions of positive effects from a combination of phosphazene and phosphinate.

DE-A-69907251 describes flame-retardant resin compositions comprising 100 parts by weight of a thermoplastic resin, 0.001-50 parts by weight of a thermotropic liquid-crystal polymer and 1-30 parts by weight of a halogen-free phosphazene compound. Disadvantages arising from the need to add a liquid-crystalline polymer are the high price and the difficulty of processing such molding compounds.

Thermoplastics are processed primarily in the melt. There is hardly any plastic which withstands the associated structural changes and changes of state without undergoing alteration to its chemical structure. Possible consequences include crosslinking, oxidation, changes in molecular weight, and hence also alterations to the physical and technical properties. In order to reduce the exposure of the polymers during processing, additives are added which differ according to the particular plastic.

Different additives are oftentimes used simultaneously, each taking on a defined function. For instance, antioxidants and stabilizers are used so that the plastic withstands processing without suffering chemical detriment and is subsequently stable for long times with respect to external influences such as heat, UV light, weathering, and oxygen (air). In addition to improving the flow characteristics, lubricants prevent excessive sticking of the plastics melt to hot machine components, and act as dispersants for pigments, fillers, and reinforcing agents.

Flame retardants can be used to influence the stability of plastics during processing in the melt. Flame retardants must frequently be added at high levels in order to ensure adequate flame retardancy of the plastic in accordance with international standards. On account of their chemical reactivity, which is required for the flame retardancy effect at high temperatures, flame retardants may adversely affect the processing stability of plastics. For example, there may be increased polymer degradation, crosslinking reactions, or instances of outgassing or of discoloration.

Polyamides are stabilized, for example, by small amounts of copper halides and also of aromatic amines and sterically hindered phenols, with the focus being on achieving long-term stability under high sustained service temperatures (H. Zweifel (Ed.): "Plastics Additives Handbook", 5$^{th}$ Edition, Carl Hanser Verlag, Munich, 2000, pages 80 to 84).

Particularly in the context of phosphorus-containing flame retardants used in polyamides, the activity of the stabilizers hitherto described has proved to be insufficient, especially in suppressing the effects that occur during processing, such as discoloration and molecular weight reduction. Moreover, halogen-free polyamide compositions frequently do not exhibit adequate results in terms of Glow Wire Ignition Temperature (GWIT)—i.e., there is unwanted ignition of the polyamide at the tip of the glow wire whose temperature is 750° C.

It was an object of the present invention, therefore, to provide halogen-free, flame-retarded, thermoplastic polyamide compositions (molding compounds), based on phosphinate-containing flame retardant systems, that have a high thermal stability, reliably meet not only UL 94 V-0, for a specimen wall thickness of down to 0.4 mm, but also reliably meet the glow wire requirements—Glow Wire Flammability Index (GWFI) 960° C. and GWIT 775° C. at all wall thicknesses tested, and that do not exhibit migration effects and that display high flowability and also high electrical values (Comparative Tracking Index (CTI)>550V).

It has now surprisingly been found that in particular the glow wire stability and the impact strength of phosphinate-containing, flame-retarded, thermoplastic polyamides can be improved significantly if the molding compound comprises not only the phosphinates (component B)) but also a salt of phosphorous acid (also referred to as phosphonic acid) $HP(=O)(OH)_2$ (component C)), and a phosphazene (component D)). With this specific combination, the balanced profile of properties of the polyamides in terms of electrical and mechanical properties is largely retained. Furthermore, the polyamide composition (molding compound) comprises fillers and/or reinforcing agents as component E).

The polyamide composition of the invention can further comprise, as component F), a phosphonite or a phosphonite/phosphite mixture, and, as component G), an ester or a salt of long-chain aliphatic carboxylic acids (fatty acids), which typically have chain lengths of $C_{14}$ to $C_{40}$.

The invention accordingly provides a flame-retardant polyamide composition comprising
  as component A) 1 to 96 wt % of one or more thermoplastic polyamides,
  as component B) 2 to 25 wt % of a dialkylphosphinic salt of the formula (I), and/or of a diphosphinic salt of the formula (II), and/or of polymers thereof,

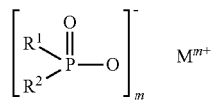
(I)

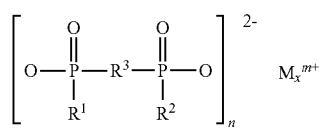
(II)

in which
$R^1$ and $R^2$ are identical or different and are $C_1$-$C_6$-alkyl, linear, or branched, or H;
$R^3$ is $C_1$-$C_{10}$-alkylene, linear, or branched, $C_6$-$C_{10}$-arylene, $C_7$-$C_{20}$-alkylarylene, or $C_7$-$C_{20}$-arylalkylene;
M is Mg, Ca, Al, Sb, Sn, Ge, Ti, Zn, Fe, Zr, Ce, Bi, Sr, Mn, Li, Na, K and/or a protonated nitrogen base;
m is 1 to 4;
n is 1 to 4;
x is 1 to 4,
as component C) 1 to 20 wt % of a salt of phosphorous acid,
as component D) 1 to 20 wt % of a phosphazene of the formulae (III) or (IV)

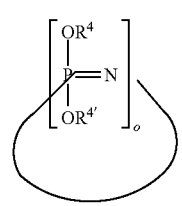
(III)

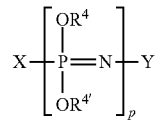
((IV)

in which in formula (III)
o is an integer from 3 to 25
and in formula (IV)
p is an integer from 3 to 1000, and
X is $-N=P(OPh)_3$ or $-N=P(O)OPh$ and
Y is $-P(OPh)_4$, or $-P(O)(OPh)_2$,
$R^4$ and $R^{4'}$ are identical or different and are $C_1$-$C_{20}$-alkyl, $C_6$-$C_{30}$-aryl, $C_6$-$C_{30}$-arylalkyl, or $C_6$-$C_{30}$-alkyl-substituted aryl,
as component E) 0 to 50 wt % of filler or reinforcing agent,
as component F) 0 to 2 wt % of a phosphonite or of a mixture of a phosphonite and a phosphite, and
as component G) 0 to 2 wt % of an ester or salt of long-chain aliphatic carboxylic acids (fatty acids), which typically have chain lengths of $C_{14}$ to $C_{40}$, the sum of the components always being 100 wt %.

The flame-retardant polyamide composition preferably comprises
  15 to 89.9 wt % of component A),
  5 to 20 wt % of component B),
  2 to 10 wt % of component C),
  2 to 10 wt % of component D),
  1 to 50 wt % of component E),
  0 to 2 wt % of component F), and
  0.1 to 1 wt % of component G).

More preferably the flame-retardant polyamide composition comprises
  15 to 75.8 wt % of component A),
  5 to 20 wt % of component B),
  2 to 10 wt % of component C),
  2 to 10 wt % of component D),
  15 to 35 wt % of component E),
  0.1 to 1 wt % of component F), and
  0.1 to 1 wt % of component G).

With more particular preference the flame-retardant polyamide composition comprises
  35 to 65.8 wt % of component A),
  5 to 20 wt % of component B),
  2 to 7 wt % of component C),
  2 to 7 wt % of component D),
  25 to 35 wt % of component E),
  0.1 to 5 wt % of component F), and
  0.1 to 5 wt % of component G).

In another embodiment, the flame-retardant polyamide composition comprises
  35 to 96 wt % of component A),
  2 to 25 wt % of component B),
  1 to 20 wt % of component C),
  1 to 20 wt % of component D),
  0 to 50 wt % of component E),
  0 to 2 wt % of component F), and
  0 to 2 wt % of component G).

The flame-retardant polyamide composition preferably has a Comparative Tracking Index (CTI) as measured to International Electrotechnical Commission Standard IEC-60112/3 of greater than 550 volts.

The flame-retardant polyamide composition preferably attains a rating of V0 to UL-94 for a specimen thickness of 3.2 mm to 0.4 mm.

The flame-retardant polyamide composition preferably has a Glow Wire Flammability Index (GWFI) to IEC-60695-2-12 of 960° C. for a specimen thickness of 0.75-3 mm.

The flame-retardant polyamide composition preferably has a Glow Wire Ignition Temperature Index (GWIT) to IEC-60695-2-13 of 750° C. or more for a specimen thickness of 0.75-3 mm.

The polyamide (PA) is preferably selected from the group of PA 6, PA 6.6, PA 4.6, PA 12, PA 6.10, PA 4.10, PA 10.10, PA 11, PA 6T/66, PA 6T/6, PA 4T, PA 9T, PA 10T, polyamide copolymers, polyamide blends and combinations thereof.

Component A) preferably comprises polyamide 66 or copolymers or polymer blends of polyamide 66 and polyamide 6.

The phosphazenes are preferably phenoxyphosphazenes.

In component B), $R^1$ and $R^2$ are preferably identical or different and are methyl, ethyl, n-propyl, isopropyl, n-butyl, tert-butyl, n-pentyl and/or phenyl.

In component B), $R^3$ is preferably methylene, ethylene, n-propylene, isopropylene, n-butylene, tert-butylene, n-pentylene, n-octylene, or n-dodecylene; phenylene, or naphthylene; methylphenylene, ethylphenylene, tert-butylphenylene, methyl-naphthylene, ethyl-naphthylene, or tert-butylnaphthylene; phenylmethylene, phenylethylene, phenylpropylene, or phenylbutylene.

The salt of phosphorous acid (component C)) preferably conforms to the formula (V)

$$[HP(=O)O_2]^{2-}M^{m+} \quad (V)$$

in which

M is Mg, Ca, Al, Sb, Sn, Ge, Ti, Zn, Fe, Zr, Ce, Bi, Sr, Mn, Li, Na and/or K.

The salt of phosphorous acid (component C)) preferably comprises aluminum phosphite $Al(H_2PO_3)_3$, secondary aluminum phosphite $Al_2(HPO_3)_3$, aluminum phosphite tetrahydrate $Al_2(HPO_3)_3*4aq$, aluminum phosphonate, basic aluminum phosphite $Al(OH)(H_2PO_3)_2*2aq$, $Al_7(HPO_3)_9(OH)_6(1,6\text{-hexanediamine})_{1.5}*12H_2O$, $Al_2(HPO_3)_3*xAl_2O_3*nH_2O$ with x=1-2.27 and n=1-50, and/or $Al_4H_6P_{16}O_{18}$.

The salt of phosphorous acid preferably also comprises aluminum phosphites of the formulae (VI), (VII), and/or (VIII), where formula (VI) comprises $Al_2(HPO_3)_3x(H_2O)_q$ and
q is 0 to 4;

formula (VII) comprises $Al_{2.00}M_z(HPO_3)_y(OH)_v x(H_2O)_w$ and
M are alkali metal ions,
z is 0.01 to 1.5,
y is 2.63 to 3.5,
v is 0 to 2, and
w is 0 to 4;

formula (VIII) comprises $Al_{2.00}(HPO_3)_u(H_2PO_3)_t x(H_2O)_s$ and
u is 2 to 2.99 and
t is 2 to 0.01, and
s is 0 to 4, or the aluminum phosphite comprises mixtures of aluminum phosphite of the formula (VI) with sparingly soluble aluminum salts and nitrogen-free foreign ions, mixtures of aluminum phosphite of the formula (VIII) with aluminum salts, mixtures of aluminum phosphites of the formulae (VI), (VII) and/or (VIII) with aluminum phosphite $[Al(H_2PO_3)_3]$, with secondary aluminum phosphite $[Al_2(HPO_3)_3]$, with basic aluminum phosphite $[Al(OH)(H_2PO_3)_2*2aq]$, with aluminum phosphite tetrahydrate $[Al_2(HPO_3)_3*4aq]$, with aluminum phosphonate, with $Al_7(HPO_3)_9(OH)_6(1,6\text{-hexanediamine})_{1.5}*12H_2O$, with $Al_2(HPO_3)_3*xAl_2O_3*nH_2O$ with x=1-2.27 and n=1-50, and/or with $Al_4H_6P_{16}O_{18}$.

Component C) preferably has an average particle size of 0.2 to 100 μm.

The reinforcing filler or reinforcing agent (component E)) preferably comprises glass fibers.

The phosphonites (component F)) are preferably of the general structure

$$R—[P(OR^5)_2]_m \quad (IX)$$

where

R is a mono- or polyvalent aliphatic, aromatic, or heteroaromatic organic radical and $R^5$ is a compound of the structure (X)

or the two radicals $R^5$ form a bridging group of the structure (XI)

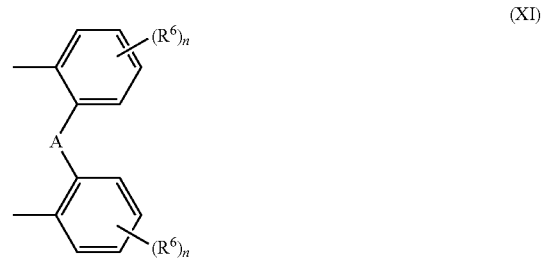

where

A is a direct bond, O, S, $C_{1-18}$-alkylene (linear, or branched) or $C_{1-18}$-alkylidene (linear, or branched), and in which $R^6$ independently at each occurrence is $C_{1-12}$-alkyl (linear, or branched), $C_{1-12}$-alkoxy and/or $C_{5-12}$-cycloalkyl, and n is 0 to 5 and m is 1 to 4.

Component G) preferably comprises alkali metal, alkaline earth metal, aluminum and/or zinc salts of long-chain fatty acids having 14 to 40 carbon atoms and/or comprises reaction products of long-chain fatty acids having 14 to 40 carbon atoms with polyhydric alcohols, such as ethylene glycol, glycerol, trimethylolpropane and/or pentaerythritol.

The invention also relates to a three-dimensional article comprising the flame-retardant polyamide composition as claimed in one or more of claims 1 to 21 and selected from moldings, injection-molded parts, extrusion compounds and/or extruded parts.

The invention relates, moreover, to the use of a flame-retardant polyamide composition as claimed in one or more of claims 1 to 11 in or for plug connectors, current-contacted components in power distributors (differential-current protection), circuit boards, encapsulating compounds, power plugs, circuit breakers, lamp housings, LED housings, capacitor housings, coil elements and ventilators, for grounding contacts, for plugs, in/on circuit boards, housings for plugs, cables, flexible printed circuit boards, charging cables for cell phones, engine covers, textile coatings, and other products.

The preparation of the phosphazenes which can be used in accordance with the invention is described in EP-A-0945478.

Particularly preferred are cyclic phenoxyphosphazenes of the formula (XII) $P_3N_3C_{36}$

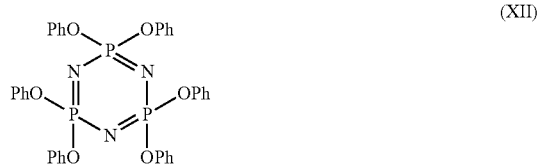 [SMILES: c1ccc(OP2(Oc3ccccc3)=NP(Oc3ccccc3)(Oc3ccccc3)=NP(Oc3ccccc3)(Oc3ccccc3)=N2)cc1]

or linear phenoxyphosphazenes according to formula (XIII)

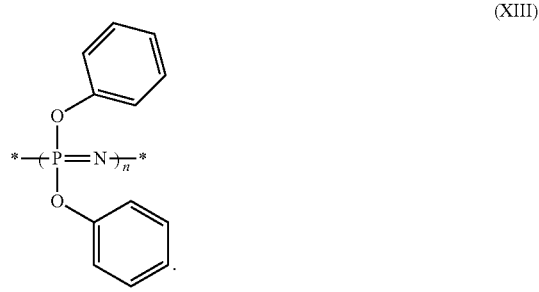

The phenyl radicals may optionally be substituted. Phosphazenes along the lines of the present specification are described in Mark, J. A., Allcock, H. R., West, R., "Inorganic Polymers", Prentice Hall International, 1992, pages 61-141.

Component A) preferably comprises polyamide 66 or copolymers or polymer blends of polyamide 66 and polyamide 6.

Component A) consists preferably of polyamide 66 to an extent of at least 75 wt %, and of polyamide 6 to an extent of not more than 25 wt %.

Surprisingly it has been found that the flame-retardant polyamide compositions of the invention exhibit a good flame retardancy effect (V-0 and GWFI/GWIT) in combination with improved flowability, high thermal stability, and high impact toughness. Polymer degradation is prevented or very greatly reduced, and there are no mold deposits or instances of efflorescence observed. The flame-retardant polyamide compositions of the invention, moreover, exhibit only slight discoloration on processing in the melt.

As component A), the compositions in accordance with the invention comprise at least one thermoplastic polyamide.

Thermoplastic polyamides, with reference to Hans Domininghaus in "Die Kunststoffe und ihre Eigenschaften", 5th edition (1998), page 14, are understood to be polyamides whose molecular chains have no lateral branches or else have lateral branches which differ in length and in number, these polyamides softening when heated and having almost unlimited moldability.

The polyamides preferred in accordance with the invention may be produced by various processes and synthesized from a very wide variety of building blocks, and in a specific application may be processed alone or in combination with processing assistants, stabilizers, or else polymeric alloying partners, preferably elastomers, to give materials having custom-tailored combinations of properties. Also suitable are blends with fractions of other polymers, preferably of polyethylene, polypropylene, ABS, in which case one or more compatibilizers may optionally be employed. The properties of the polyamides can be improved by addition of elastomers, in respect of the impact toughness, for example, particularly when the polyamides are reinforced. The many possible combinations allow a very large number of products having a very wide variety of properties.

For the production of polyamides there are a large number of procedures known, with different monomer building blocks, different chain transfer agents for setting a desired molecular weight, or else monomers with reactive groups, for subsequently intended aftertreatments, being used according to the desired end product.

The industrially relevant processes for producing polyamides usually proceed via polycondensation in the melt. In this context, the hydrolytic polymerization of lactams is also understood as a polycondensation.

Polyamides for preferred use as component A) are semicrystalline polyamides, which can be prepared starting from diamines and dicarboxylic acids and/or lactams having at least 5 ring members, or from corresponding amino acids.

Reactants contemplated include aliphatic and/or aromatic dicarboxylic acids, preferably adipic acid, 2,2,4- and 2,4,4-trimethyladipic acid, azelaic acid, sebacic acid, isophthalic acid, terephthalic acid, aliphatic and/or aromatic diamines, preferably tetramethylenediamine, hexamethylenediamine, 1,9-nonanediamine, 2,2,4- and 2,4,4-trimethylhexamethylenediamine, the isomeric diaminodicyclohexylmethanes, diaminodicyclohexylpropanes, bisaminomethylcyclohexane, phenylenediamines, xylylenediamines, aminocarboxylic acids, preferably aminocaproic acid, or the corresponding lactams. Copolyamides of two or more of the stated monomers are included. Particular preference is given to using caprolactams, especially preferably [epsilon]-caprolactam.

Also particularly suitable are compounded formulations, usually based on PA6, PA66, and other aliphatic and/or aromatic polyamides or copolyamides, in which there are 3 to 11 methylene groups in the polymer chain per polyamide group.

The polyamides and copolyamides preferably comprises polyamide 12, polyamide 4, polyamide 4.6, polyamide 6, polyamide 6.6, polyamide 6.9, polyamide 6.10, polyamide 6.12, polyamide 6.66, polyamide 7.7, polyamide 8.8, polyamide 9.9, polyamide 10.9, polyamide 10.10, polyamide 11, polyamide 12, etc. These polyamides and copolyamides are known, for example, under the trade names Nylon® from DuPont, Ultramid® from BASF, Akulon® K122 from DSM, Zytel® 7301 from DuPont; Durethan® B 29 from Bayer, and Grillamid® from Ems Chemie.

Also of preferred suitability are aromatic polyamides starting from m-xylene, diamine, and adipic acid; polyamides prepared from hexamethylenediamine and iso- and/or terephthalic acid with optionally an elastomer as modifier, e.g., poly-2,4,4-trimethylhexamethyleneterephthalamide or poly-m-phenyleneisophthalamide, block copolymers of the aforementioned polyamides with polyolefins, olefin copolymers, ionomers, or chemically bonded or grafted elastomers, or with polyethers, such as with polyethylene glycol, polypropylene glycol, or polytetramethylene glycol, for example. Additionally suitable are EPDM- or ABS-modified polyamides or copolyamides, and also polyamides condensed in the course of processing ("RIM polyamide systems").

In one preferred embodiment, the compositions of the invention comprise not only the thermoplastic polyamide for use in accordance with the invention but also at least one further thermoplastic polymer, more preferably at least one other polyamide.

Preference is given to aliphatic polyamides, more particularly PA6 and PA66 and PA 6T/66 and PA 6T/6. Especially preferred are mixtures of polyamide 66 and polyamide 6 with preferably polyamide 66 at more than 50 wt % and polyamide 6 at less than 50 wt %, and more preferably polyamide 6 at less than 25 wt %, based in each case on the total amount of polyamide.

Also preferred are blends of polyamide 66 and one or more partially aromatic, amorphous polyamides.

The polymers for additional use in one preferred embodiment, besides the thermoplastic polyamide, may be admixed in the melt with customary additives, especially mold release agents, stabilizers and/or flow aids, or may have such additives applied to their surface. Starting materials for the thermoplastic polyamides of component A) may originate synthetically, for example, from petrochemical raw materials and/or, via chemical or biochemical processes, from renewable raw materials.

It is also possible for other flame retardants or flame retardant synergists, not specifically mentioned here, to be employed. In particular, nitrogen-containing flame retardants such as melamine cyanurate, condensed melamine (melem, melon), or melamine phosphates and melamine polyphosphates may be added. It is also possible for further phosphorus flame retardants to be used, such as aryl phosphates or red phosphorus. It is also possible, furthermore, for salts of aliphatic and aromatic sulfonic acids and mineral flame retardancy additives such as aluminum and/or magnesium hydroxide or Ca Mg carbonate hydrates (e.g., DE-A-4236122) to be used. Additionally suitable are flame retardant synergists from the oxygen-, nitrogen-, or sulfur-containing metal compound group, preferably zinc oxide, zinc borate, zinc stannate, zinc hydroxystannate, zinc sulfide, molybdenum oxide, titanium dioxide, magnesium oxide, magnesium carbonate, calcium carbonate, calcium oxide, titanium nitride, boron nitride, magnesium nitride, zinc nitride, zinc phosphate, calcium phosphate, calcium borate, magnesium borate, or mixtures thereof.

Further flame retardancy additives with preferential suitability are carbonizing agents, very preferably phenol-formaldehyde resins, polycarbonates, polyimides, polysulfones, polyethersulfones, or polyetherketones, and also antidripping agents, more particularly tetrafluoroethylene polymers.

The flame retardants can be added in pure form, and also via masterbatches or compactates.

Component B preferably comprises the aluminum salt or the zinc salt of diethylphosphinic acid.

For the aluminum phosphite of the formula (VI), preferably q is 0.01 to 0.1.

For the aluminum phosphite of the formula (VII), preferably z is 0.15 to 0.4;
y is 2.80 to 3;
v is 0.1 to 0.4; and
w is 0.01 to 0.1.

For the aluminum phosphite of the formula (VIII), preferably u is 2.834 to 2.99;
t is 0.332 to 0.03; and
s is 0.01 to 0.1.

The phosphazene (component D)) is preferably a cyclic phenoxyphosphazene of the formula $P_3N_3C_{36}$.

As component E), the flame-retardant polyamide compositions of the invention, in a further preferred embodiment, may comprise at least one filler or reinforcing agent.

Here it is also possible to use mixtures of two or more different fillers and/or reinforcing agents, preferably based on talc, mica, silicate, quartz, titanium dioxide, wollastonite, kaolin, amorphous silicas, nanoscale minerals, very preferably montmorillonites or nanoboehmite, magnesium carbonate, chalk, feldspar, barium sulfate, glass beads and/or fibrous fillers and/or reinforcing agents based on carbon fibers and/or glass fibers. Preference is given to using particulate mineral fillers based on talc, mica, silicate, quartz, titanium dioxide, wollastonite, kaolin, amorphous silicas, magnesium carbonate, chalk, feldspar, barium sulfate and/or glass fibers. Particular preference is given to using particulate mineral fillers based on talc, wollastonite, kaolin and/or glass fibers, with glass fibers being especially preferred.

Particularly preferred for use, furthermore, are acicular mineral fillers. Acicular mineral fillers for the purposes of the invention refer to a mineral filler having a sharply pronounced acicular (needle-shaped) character. Acicular wollastonites may be mentioned for preference. The mineral preferably has a length to diameter ratio of 2:1 to 35:1, more preferably of 3:1 to 19:1, especially preferably of 4:1 to 12:1. The average particle size of the acicular minerals which can be used in accordance with the invention is preferably less than 20 µm, more preferably less than 15 µm, especially preferably less than 10 µm, as determined using a CILAS granulometer.

In one preferred embodiment, the filler and/or reinforcing agent may have been surface-modified, preferably with an adhesion promoter or adhesion promoter system, more preferably silane-based. The pretreatment is not absolutely necessary, however. Particularly when using glass fibers, it is also possible, in addition to silanes, to use polymer dispersions, film formers, branching agents and/or glass fiber processing aids.

The glass fibers for use very preferably as component E) in accordance with the invention, with a fiber diameter of generally between 7 and 18 µm, preferably between 9 and 15 µm, are added in the form of continuous fibers or in the form of chopped or ground glass fibers. These fibers may have been equipped with a suitable size system and with an adhesion promoter or adhesion promoter system, preferably silane-based.

The polyamide compositions of the invention can also comprise other additives. Preferred additives for the purposes of the present invention are antioxidants, UV stabilizers, gamma-radiation stabilizers, hydrolysis stabilizers, antistatic agents, emulsifiers, nucleating agents, plasticizers, processing aids, impact modifiers, dyes, and pigments. The additives can be used alone or in a mixture, or in the form of masterbatches.

Examples of suitable antioxidants are alkylated monophenols, e.g. 2,6-di-tert-butyl-4-methylphenol; alkylthiomethylphenols, e.g. 2,4-dioctylthiomethyl-6-tert-butylphenol; hydroquinones and alkylated hydroquinones, e.g. 2,6-di-tert-butyl-4-methoxyphenol; tocopherols, e.g. α-tocopherol, β-tocopherol, γ-tocopherol, δ-tocopherol, and mixtures thereof (vitamin E); hydroxylated thiodiphenyl ethers, e.g. 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl) disulfide; alkylidenebisphenols, e.g. 2,2'-methylenebis(6-tert-butyl-4-methylphenol); O-, N-, and S-benzyl compounds, e.g. 3,5,3',5'-tetra-tert-butyl-4,4'-dihydroxydibenzyl ether; hydroxybenzylated malonates, e.g. dioctadecyl 2,2-bis(3,5-di-tert-butyl-2-hydroxybenzyl)malonate; hydroxybenzylaromatics, e.g. 1,3,5-tris(3,5-di-tert-butyl)-4-hydroxybenzyl-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl) phenol; triazine compounds, e.g. 2,4-bisoctylmercapto-6-(3,5-di-tert-butyl-4-hydroxyanilino)-1,3,5-triazine; benzyl phosphonates, e.g. dimethyl 2,5-di-tert-butyl-4-hydroxybenzylphosphonate; acylaminophenols, 4-hydroxylauramide, 4-hydroxystearanilide, octyl N-(3,5-di-tert-butyl-4-hydroxyphenyl)carbamate; esters of β-(3,5-di-tert-butyl-4-hydroxyphenyl)propionic acid with mono- or polyhydric alcohols; esters of β-(5-tert-butyl-4-hydroxy-3-methylphenyl)propionic acid with mono- or polyhydric alcohols; esters of β-(3,5-dicyclohexyl-4-hydroxyphenyl) propionic acid with mono- or polyhydric alcohols; esters of 3,5-di-tert-butyl-4-hydroxyphenylacetic acid with mono- or polyhydric alcohols; amides of β-(3,5-di-tert-butyl-4-hydroxyphenyl)propionic acid, for example N,N'-bis(3,5-di-tert-butyl-4-hydroxyphenylpropionyl)hexamethylenediamine, N,N'-bis(3,5-di-tert-butyl-4-hydroxyphenylpropionyl)trimethylenediamine, N,N'-bis(3,5-di-tert-butyl-4-hydroxyphenylpropionyl)hydrazine.

It is particularly preferable to use sterically hindered phenols alone or in combination with phosphites, and very particular preference is given to the use of N, N'-bis[3-(3', 5'-di-tert-butyl-4'-hydroxyphenyl)propionyl]hexamethylenediamines (e.g. Irganox® 1098 from BASF SE, Ludwigshafen, Germany).

Examples of suitable UV absorbers and light stabilizers are 2-(2'-hydroxyphenyl)benzotriazoles, for example 2-(2'-hydroxy-5'-methylphenyl)benzotriazole;

2-hydroxybenzophenones, for example the 4-hydroxy, 4-methoxy, 4-octoxy, 4-decyloxy, 4-dodecyloxy, 4-benzyloxy, 4,2',4'-trihydroxy, or 2'-hydroxy-4,4'-dimethoxy derivative;

esters of optionally substituted benzoic acids, for example 4-tert-butylphenyl salicylate, phenyl salicylate, octylphenyl salicylate, dibenzoylresorcinol, bis(4-tert-butylbenzoyl)resorcinol, benzoylresorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate;

acrylates, for example ethyl/isooctyl α-cyano-β,β-diphenylacrylate, methyl α-carbomethoxycinnamate, methyl/butyl α-cyano-β-methyl-p-methoxycinnamate, methyl α-carbomethoxy-p-methoxycinnamate, N-(β-carbomethoxy-β-cyanovinyl)-2-methylindoline.

Preferred colorants used are inorganic pigments, in particular titanium dioxide, ultramarine blue, iron oxide, zinc sulfide, or carbon black, and moreover organic pigments, preferably phthalocyanines, quinacridones, perylenes, and also dyes, preferably nigrosin and anthraquinones.

Examples of suitable polyamide stabilizers are copper salts in combination with iodides and/or phosphorus compounds; salts of divalent manganese are also suitable.

Suitable basic costabilizers are melamine, polyvinylpyrrolidone, dicyandiamide, triallyl cyanurate, urea derivatives, hydrazine derivatives, amines, polyamides, polyurethanes, alkali metal and alkaline earth metal salts of higher fatty acids, for example Ca stearate, Zn stearate, Mg behenate, Mg stearate, Na ricinoleate, K palmitate, antimony pyrocatecholate, or tin pyrocatecholate.

Examples of suitable nucleating agents are 4-tert-butylbenzoic acid, adipic acid, and diphenylacetic acid, aluminum oxide or silicon dioxide, and also especially preferably talc, this list being non-exclusive.

It is preferable to use, as flow aids, copolymers of at least one α-olefin with at least one methacrylic or acrylic ester of an aliphatic alcohol. Particular preference is given here to copolymers in which the α-olefin is composed of ethene and/or propene and the methacrylic or acrylic ester comprises, as alcohol component, linear or branched alkyl groups having 6 to 20 carbon atoms. Very particular preference is given to 2-ethylhexyl acrylate.

A feature of copolymers that are suitable as flow aids in the invention is not only their composition but also their low molecular weight. Accordingly, copolymers suitable for the compositions that are to be protected from thermal degradation in the invention are especially those having a Melt Flow Index (MFI) value of at least 100 g/10 min, preferably at least 150 g/10 min, very preferably at least 300 g/10 min, measured at 190° C. under a load of 2.16 kg. The MFI serves to characterize the flow of a melt of a thermoplastic and is subject to the standards ISO 1133 or ASTM D 1238. For the purposes of the present invention, MFI and all data relating to MFI are based on and/or were uniformly measured/determined in accordance with ISO 1133 at 190° C. with a test weight of 2.16 kg.

Plasticizers to be used are preferably dioctyl phthalate, dibenzyl phthalate, butyl benzyl phthalate, hydrocarbon oils, or N-(n-butyl)benzenesulfonamide.

However, the present invention also provides products, preferably fibers, foils, or moldings, obtainable via injection molding or extrusion from the compositions described in the invention.

Suitable phosphinates (component B)) are described in PCT/WO97/39053, expressly incorporated herein by reference. Particularly preferred phosphinates are aluminum, calcium, and zinc phosphinates.

Preferred salts of phosphorous acid (component C)) are salts that are insoluble in water or are sparingly soluble in water.

Particularly preferred salts of phosphorous acid are the aluminum, calcium, and zinc salts.

It is particularly preferable that component C) is a reaction product of phosphorous acid and of an aluminum compound.

Preference is given to aluminum phosphites with the following CAS numbers: 15099-32-8, 119103-85-4, 220689-59-8, 56287-23-1, 156024-71-4, 71449-76-8, and 15099-32-8.

It is preferable that particle sizes of the aluminum phosphites are 0.2-100 μm.

The preferred aluminum phosphites are produced by reaction of an aluminum source with a phosphorus source and if desired a template in a solvent at 20-200° C. over a period of up to 4 days. For this, aluminum source and phosphorus source are mixed for 1-4 h and heated under hydrothermal conditions or at reflux, and the solid is isolated by filtration and washed and dried at, for example, 110° C.

Preferred aluminum sources are aluminum isopropoxide, aluminum nitrate, aluminum chloride, and aluminum hydroxide (e.g., pseudoboehmite).

Preferred phosphorus sources are phosphorous acid, (acidic) ammonium phosphite, alkali metal phosphites, or alkaline earth metal phosphites.

Preferred alkali metal phosphites are disodium phosphite, disodium phosphite hydrate, trisodium phosphite, and potassium hydrogenphosphite.

Preferred disodium phosphite hydrate is Brüggolen® H10 from Brüggemann.

Preferred templates are 1,6-hexanediamine, guanidine carbonate, or ammonia.

Preferred alkaline earth metal phosphite is calcium phosphite.

The preferred aluminum:phosphorus:solvent ratio here is 1:1:3.7 to 1:2.2:100 mol. The aluminum:template ratio is 1:0 to 1:17 mol. The preferred pH of the reaction solution is 3 to 9. Preferred solvent is water.

It is particularly preferable that the phosphinic acid salt and the phosphorous acid salt used are the same, hence for example aluminum dialkylphosphinate together with aluminum phosphite or zinc dialkylphosphinate together with zinc phosphite.

It is preferable that component G) comprises alkali metal, alkaline earth metal, aluminum and/or zinc salts of long-chain fatty acids having 14 to 40 carbon atoms and/or comprises reaction products of long-chain fatty acids having 14 to 40 carbon atoms, with polyhydric alcohols, such as ethylene glycol, glycerol, trimethylolpropane and/or pentaerythritol. It is particularly preferable that it is aluminum, calcium, or zinc stearate, or calcium montanate.

Other flame retardants are preferably aryl phosphates, phosphonates, salts of hypophosphorous acid, and red phosphorus.

In the case of the phosphonites preference is given to the following moieties:

R is $C_4$-$C_{18}$-alkyl (linear or branched), $C_4$-$C_{18}$-alkylene (linear or branched), $C_5$-$C_{12}$-cycloalkyl, $C_5$-$C_{12}$-cycloalkylene, $C_6$-$C_{24}$-aryl and -heteroaryl, $C_6$-$C_{24}$-arylene and -heteroarylene, where these can also have further substitution;

$R_1$ is a system of the structure (X) or (XI), where $R_2$ is mutually independently $C_1$-$C_8$-alkyl (linear or branched), $C_1$-$C_8$-alkoxy, cyclohexyl;

A is a direct bond, O, $C_1$-$C_8$-alkylene (linear or branched), $C_1$-$C_8$-alkylidene (linear or branched), and n is 0 to 3, and m is 1 to 3.

In the case of the phosphonites particular preference is given to the following moieties:

R is cyclohexyl, phenyl, phenylene, biphenyl, and biphenylene, $R_1$ is a system of the structure (X) or (XI), where $R_2$ is mutually independently $C_1$-$C_8$-alkyl (linear or branched), $C_1$-$C_8$-alkoxy, cyclohexyl, A is a direct bond, O, $C_1$-$C_6$-alkylidene (linear or branched), and n is 1 to 3, and m is 1 or 2.

Mixtures of compounds as per above claims are also claimed in combination with phosphites of the formula (XIV)

$$P(OR_1)_3 \qquad (XIV)$$

where the definitions of $R_1$ are those given above.

Preference is in particular given to compounds which, based on above definitions, are produced via a Friedel-Crafts reaction of an aromatic or heteroaromatic, such as benzene, biphenyl, or diphenyl ether, with phosphorus trihalides, preferably phosphorus trichloride, in the presence of a Friedel-Crafts catalyst such as aluminum chloride, zinc chloride, iron chloride, etc., and subsequent reaction with the phenols underlying the structures (X), and (XI). Materials expressly included here are also those mixtures with phosphites which arise by the reaction sequence mentioned from excess phosphorus trihalide and from the phenols described above.

Among this group of compounds, preference is in turn given to the following structures (XV), and (XVI):

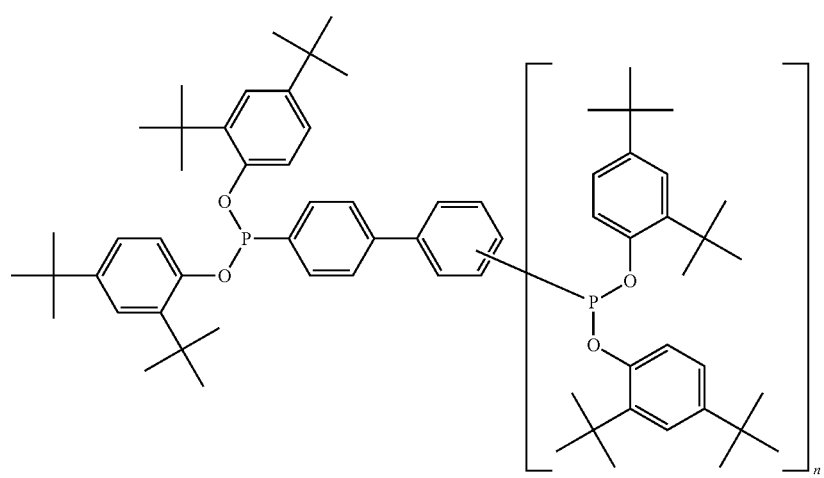

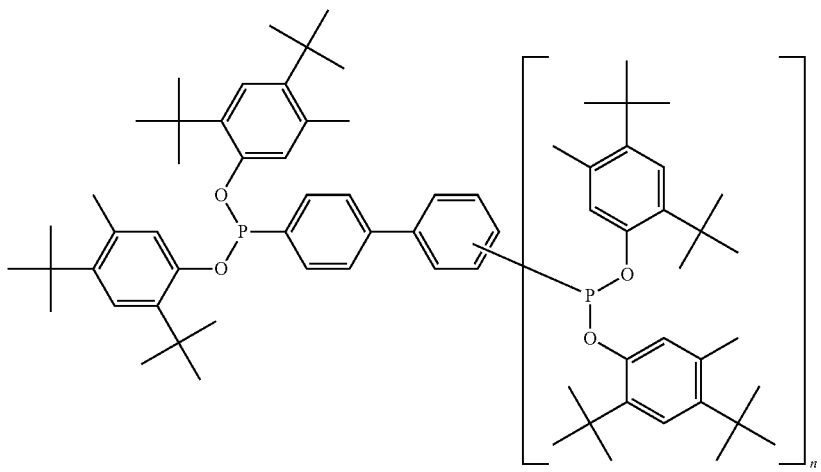

where n can be 0 or 1, and these mixtures can moreover also optionally comprise fractions of the compound (XVII) and, respectively, (XVIII):

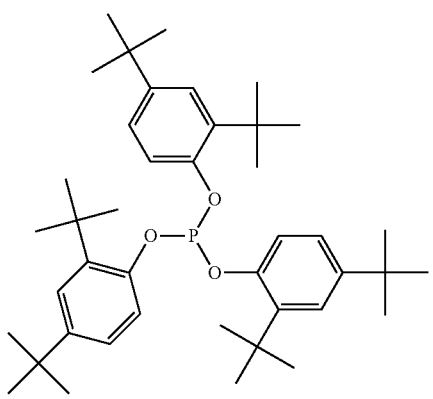

(XVII)

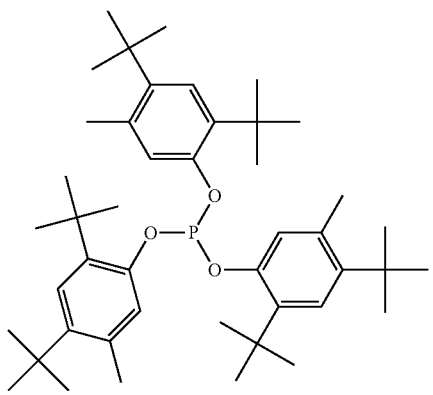

(XVIII)

Suitable components G) are esters or salts of long-chain aliphatic carboxylic acids (fatty acids) which typically have chain lengths of $C_{14}$ to $C_{40}$. The esters are reaction products of the carboxylic acids mentioned with familiar polyhydric alcohols, for example ethylene glycol, glycerol, trimethylolpropane, or pentaerythritol. Salts contemplated of the carboxylic acids mentioned are especially alkali metal or alkaline earth metal salts, aluminum salts, and zinc salts.

It is preferable that component G) comprises esters or salts of stearic acid, for example glycerol monostearate or calcium stearate.

It is preferable that component G) also comprises reaction products of montan wax acids with ethylene glycol.

It is preferable that the reaction products are a mixture of ethylene glycol mono-montan wax acid ester, ethylene glycol di-montan wax acid ester, montan wax acids, and ethylene glycol.

It is preferable that component G) also comprises reaction products of montan wax acids with a calcium salt.

It is particularly preferable that the reaction products are a mixture of 1,3-butanediol mono-montan wax acid ester, 1,3-butanediol di-montan wax acid ester, montan wax acids, 1,3-butanediol, calcium montanate, and the calcium salt.

The compositions of the invention as claimed in one or more of claims 1 to 20 preferably have a Glow Wire Ignition Temperature (GWIT) to IEC-60695-2-13 of 775° C. or more for a specimen thickness of 0.75-3 mm.

The abovementioned additives can be introduced into the plastic in a very wide variety of process steps: In the case of polyamides it is possible to mix the additives into the polymer melt at the very beginning of the polymerization/polycondensation process, or at the end thereof, or in a subsequent compounding process. There are also processing methods which delay addition of the additives to a subsequent stage. This practice is used in particular when pigment masterbatches or additive masterbatches are used. There is furthermore the possibility of application in a drum, in particular of pulverulent additives, to the polymer pellets, the temperature of which may possibly have been raised by the drying process.

Finally, the invention also provides a process for the production of flame-retarded polymer moldings which comprises processing flame-retarded polymer molding compounds of the invention by injection molding (e.g., Arburg Allrounder injection-molding machine) and compression molding, foam injection molding, internal-gas-pressure injection molding, blow molding, film casting, calendering, lamination, or coating at relatively high temperatures to give the flame-retarded polymer molding.

EXAMPLES

1. Components Used
commercially available polyamides (component A)):
polyamide 6.6 (PA 6.6-GV): Ultramid® A27 (BASF SE, D)
polyamide 6: Ultramid® B27 (BASF SE, D)
component E): PPG HP 3610 glass fibers, diameter 10 µm, length 4.5 mm (PPG, NL)
flame retardant (component B)):
aluminum salt of diethylphosphinic acid, hereinafter called DEPAL
flame retardant (component C)):
aluminum salt of phosphorous acid, hereinafter called PHOPAL
flame retardant (component D)):
Phosphazen® SPB 100, Otsuka Chemical Co., Japan
Phosphazen® Rabitle FP 110, Fushimi Pharmaceuticals, Japan
comparison: MPP, melamine polyphosphate, Melapur® 200/70, BASF AG, D
phosphonites (component F)): Sandostab® P-EPQ, Clariant GmbH, D
wax components (component G)):
Licowax® E (ester of montan wax acid), Clariant Produkte (Deutschland) GmbH, D 2. Production, Processing, and Testing of Flame-Retardant Polyamide Molding Compounds The flame retardant components were mixed in the ratio stated in the table with the phosphonite, and with the lubricants and stabilizers, and incorporated by way of the side feed of a twin-screw extruder (Leistritz ZSE 27/44D) at temperatures of 260 to 310° C. into PA 6.6 and, respectively, at 250-275° C. into PA 6. The glass fibers were added by way of a second side feed. The homogenized polymer strand was drawn off, cooled in a water bath, and then pelletized.

After adequate drying, the molding compounds were processed in an injection-molding machine (Arburg 320 C Allrounder) at melt temperatures of 250 to 300° C. to give test specimens, and tested and classified for flame retardancy on the basis of the UL 94 test (Underwriters Laboratories).

The UL 94 fire classifications are as follows:
V-0: afterflame time never longer than 10 sec, total of afterflame times for 10 flame applications not more than 50 sec, no flaming drops, no complete consumption of the specimen, afterglow time for specimens never longer than 30 sec after end of flame application.
V-1: afterflame time never longer than 30 sec after end of flame application, total of afterflame times for 10 flame applications not more than 250 sec, afterglow time for specimens never longer than 60 sec after end of flame application, other criteria as for V-0.
V-2: cotton indicator ignited by flaming drops, other criteria as for V-1.
Not classifiable (ncl): does not comply with fire classification V-2.

The glow wire resistance was determined on the basis of the IEC 60695-2-12 GWFI (Glow Wire Flammability Index) test and also the IEC 60695-2-13 GWIT (Glow Wire Ignition Temperature) test. In the case of the GWFI test, 3 specimens (for example, plates with geometry of 60×60×1.5 mm) are tested to ascertain the maximum temperature, applied by a glowing wire at temperatures between 550 and 960° C., that is not exceeded for an afterflame time of 30 seconds and for which the sample does not develop burning drops. In the case of the GWIT test, with a comparable measurement procedure, the reported result is the glow wire ignition temperature which is 25K (30K between 900° C. and 960° C.) higher than the maximum glow wire temperature which in 3 successive tests does not result in ignition, even during the time of exposure to the glow wire. Ignition in this context is considered to be represented by a flame burning for a time of 5 seconds or more.

The flowability of the molding compounds was determined via determination of the melt volume index (MVR) at 275° C./2.16 kg. Higher MVR values mean better flowability in the injection-molding process. A sharp rise in MVR value can also, however, indicate polymer degradation.

All of the experiments of the present series were, unless otherwise stated, carried out under identical conditions for reasons of comparability (temperature programs, screw geometries, injection-molding parameters, etc.).

Inventive examples IE1-IE3 list the results where the flame retardant-stabilizer mixtures of the invention were used. All quantities are stated as wt % and are based on the plastics molding compound inclusive of the flame retardants, additives, and reinforcing materials.

TABLE 1

PA 66 GF 30 Results of experiments. CE1-CE4 are comparative examples, and IE1 to IE2 are inventive polyamide molding compounds

|  |  | CE1 | CE2 | CE3 | CE4 | IE1 | IE2 |
|---|---|---|---|---|---|---|---|
| A: polyamide 66 | [wt %] | 49.55 | 49.55 | 49.55 | 39.55 | 39.55 | 49.30 |
| A: polyamide 6 | [wt %] |  |  |  | 10 | 10 |  |
| E: glass fibers HP3610 | [wt %] | 30 | 30 | 30 | 30 | 30 | 30 |
| B: DEPAL | [wt %] | 20 | 17 | 15 | 13 | 14 | 12 |
| C: PHOPAL | [wt %] |  | 3 |  |  | 3 | 3 |
| MPP | [wt %] |  |  |  | 7 |  |  |
| D: phosphazene | [wt %] |  |  | 5 |  | 3 | 5 |
| G: Licowax E | [wt %] | 0.25 | 0.25 | 0.25 | 0.25 | 0.25 | 0.25 |
| F: P-EPQ | [wt %] | 0.20 | 0.20 | 0.20 | 0.20 | 0.20 | 0.20 |
|  | Results |  |  |  |  |  |  |
| UL 94 at 0.4 mm thickness |  | V-1 | V-0 | V-1 | V-0 | V-0 | V-0 |
| GWFI | [° C.] | 850 | 960 | 850 | 960 | 960 | 960 |
| MVR 275° C./2.16 kg |  | 4 | 5 | 18 | 13 | 13 | 12 |
| GWIT | [° C.] | 700 | 725 | 725 | 750 | 800 | 800 |
| Efflorescence* |  | none | none | slight | significant | none | none |
| CTI | [volts] | 600 | 600 | 550 | 550 | 600 | 600 |

TABLE 1-continued

PA 66 GF 30 Results of experiments. CE1-CE4 are comparative examples, and IE1 to IE2 are inventive polyamide molding compounds

|  |  | CE1 | CE2 | CE3 | CE4 | IE1 | IE2 |
|---|---|---|---|---|---|---|---|
| Impact toughness | [kJ/m$^2$] | 60 | 63 | 73 | 60 | 60 | 74 |
| Notched impact toughness | [kJ/m$^2$] | 12 | 11 | 14 | 10 | 14 | 14 |

*14 days, 100% humidity, 70° C.

Only the inventive combination of polyamide, glass fibers, DEPAL, PHOPAL, and phosphazene gives polyamide molding compounds which achieve the UL 94 fire classification V-0 at 0.4 mm and at the same time have GWIT more than 775° C., CTI 600 volts, impact toughness greater than 65 kJ/m$^2$, notched impact toughness greater than 10 kJ/m$^2$, and exhibit no discoloration and no efflorescence. Use of DEPAL without PHOPAL (CE1) does not achieve V-0, and although the combination of DEPAL with MPP (CE4) achieves V-0, the polyamide molding compound exhibits discoloration and efflorescence. The CTI achieved is also not 600 V.

The combination of DEPAL with PHOPAL does not achieve the GWIT>=775° C.; the combination of DEPAL with phosphazene (CE3) does not meet UL 94 V-0 and GWIT 775° C.

TABLE 2

PA 6 GF 30 Results of experiments. CE4-CE6 are comparative examples, and IE3 and IE4 are inventive polyamide molding compounds

|  |  | CE4 | CE5 | CE6 | IE3 | IE4 |
|---|---|---|---|---|---|---|
| A: polyamide 6 | [wt %] | 49.55 | 49.55 | 49.55 | 49.55 | 49.55 |
| E: glass fibers HP3610 | [wt %] | 30 | 30 | 30 | 30 | 30 |
| B: DEPAL | [wt %] | 20 | 12 | 17 | 12 | 14 |
| C: PHOPAL | [wt %] |  |  | 3 | 3 | 3 |
| MPP | [wt %] |  | 8 |  |  |  |
| E: phosphazene | [wt %] |  |  |  | 5 | 3 |
| G: Licowax E | [wt %] | 0.25 | 0.25 | 0.25 | 0.25 | 0.25 |
| F: P-EPQ | [wt %] | 0.20 | 0.20 | 0.20 | 0.20 | 0.20 |
|  | Results |  |  |  |  |  |
| UL 94 at 0.4 mm thickness |  | V-1 | V-0 | V-0 | V-0 | V-0 |
| GWIT | [° C.] | 700 | 775 | 725 | 800 | 775 |
| MVR 250° C./2.16 kg |  | 5 | 12 | 5 | 10 | 8 |
| Efflorescence* |  | none | significant | none | none | none |
| CTI | [volts] | 600 | 550 | 600 | 600 | 600 |
| Impact toughness | [kJ/m$^2$] | 61 | 59 | 63 | 69 | 63 |
| Notched impact toughness | [kJ/m$^2$] | 11 | 9.8 | 11 | 13 | 11 |

*14 days, 100% humidity, 70° C.

A similar picture is revealed by the experiments in polyamide 6: only the inventive combination of polyamide 6 with glass fibers, DEPAL, PHOPAL, and phosphazene gives molding compounds which simultaneously have UL 94 V-0 at 0.4 mm, GWIT>=775° C., CTI 600 V, no efflorescence, good flowability, and good mechanical properties.

The invention claimed is:

1. A flame-retardant polyamide composition comprising as component A) 1 to 96 wt % of one or more thermoplastic polyamides, as component B) 2 to 25 wt % of a dialkylphosphinic salt of the formula (I), a diphosphinic salt of the formula (II), or a combination thereof,

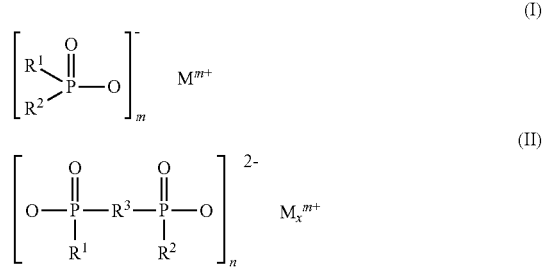

wherein
$R^1$ and $R^2$ are identical or different and are $C_1$-$C_6$-alkyl, linear, or branched, or H;
$R^3$ is $C_1$-$C_{10}$-alkylene, linear, or branched, $C_6$-$C_{10}$-arylene, $C_7$-$C_{20}$-alkylarylene, or $C_7$-$C_{20}$-arylalkylene;
M is Mg, Ca, Al, Sb, Sn, Ge, Ti, Zn, Fe, Zr, Ce, Bi, Sr, Mn, Li, Na, K, a protonated nitrogen base or a combination thereof;
m is 1 to 4;
n is 1 to 4;
x is 1 to 4,
as component C) 1 to 20 wt % of a salt of phosphorous acid of the formula (V)

$$[HP(=O)O_2]^{2-}M^{m+} \quad (V)$$

wherein M is Mg, Ca, Al, Sb, Sn, Ge, Ti, Zn, Fe, Zr, Ce, Bi, Sr, Mn, Li, N, K or a combination thereof,
as component D) 1 to 20 wt % of a phosphazene of the formula (III) or formula (IV)

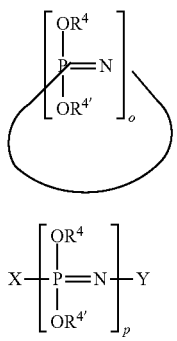

wherein in formula (III)
o is an integer from 3 to 25
and in formula (IV)
p is an integer from 3 to 1000, and
X is —N=P(OPh)$_3$ or —N=P(O)OPh and
Y is —P(OPh)$_4$, or —P(O)(OPh)$_2$,
R$^4$ and R$^{4'}$ are identical or different and are C$_1$-C$_{20}$-alkyl, C$_6$-C$_{30}$-aryl, C$_6$-C$_{30}$-arylalkyl, or C$_6$-C$_{30}$-alkyl-substituted aryl,
as component E) 0 to 50 wt % of filler or reinforcing agent,
as component F) 0 to 2 wt % of a phosphonite or of a mixture of a phosphonite and a phosphite, and
as component G) 0 to 2 wt % of an ester or salt of long-chain aliphatic carboxylic acids (fatty acids), having a chain length of C$_{14}$ to C$_{40}$, the sum of the components always being 100 wt %,
wherein the flame-retardant polyamide composition has
a Comparative Tracking Index (CTI) of greater than 500 volts as measured to International Electrotechnical Commission Standard IEC-60112/3;
a rating of V-0 to UL-94 for a specimen thickness of 3.2 mm to 0.4 mm;
a Glow Wire Flammability Index (GWFI) to IEC-60695-2-12 of 850° C. or more for a specimen thickness of 0.75-3 mm; and
a Glow Wire Ignition Temperature Index (GWIT) to IEC-60695-2-13 of 750° C. or more for a specimen thickness of 0.75-3 mm.

2. The flame-retardant polyamide composition as claimed in claim 1, comprising
15 to 89.9 wt % of component A),
5 to 20 wt % of component B),
2 to 10 wt % of component C),
2 to 10 wt % of component D),
1 to 50 wt % of component E),
0 to 2 wt % of component F), and
0.1 to 1 wt % of component G).

3. The flame-retardant polyamide composition as claimed in claim 1, comprising
15 to 75.8 wt % of component A),
5 to 20 wt % of component B),
2 to 10 w % of component C),
2 to 10 wt % of component D),
15 to 35 w % of component E),
0.1 to 1 wt % of component F),
and 0.1 to 1 wt % of component G).

4. The flame-retardant polyamide composition as claimed in claim 1, comprising
35 to 65.8 wt % of component A),
5 to 20 wt % of component B),
2 to 7 wt % of component C),
2 to 7 wt % of component D),
25 to 35 wt % of component E),
0.1 to 0.5 wt % of component F), and
0.1 to 0.5 wt % of component G).

5. The flame-retardant polyamide composition as claimed in claim 1, comprising
35 to 96 wt % of component A),
2 to 25 wt % of component B),
1 to 20 wt % of component C),
1 to 20 wt % of component D),
0 to 50 wt % of component E),
0 to 2 wt % of component F), and
0 to 2 wt % of component G).

6. The flame-retardant polyamide composition as claimed in claim 1, wherein the polyamide (PA) is selected from the group consisting of PA 6, PA 6.6, PA 4.6, PA 12, PA 6.10, PA 6T/66, PA 6T/6, PA 4T, PA 9T, PA 10T, polyamide copolymers, polyamide blends, and combinations thereof.

7. The flame-retardant polyamide composition as claimed in claim 1, wherein component A) comprises polyamide 66 or copolymers or polymer blends of polyamide 66 and polyamide 6.

8. The flame-retardant polyamide composition as claimed in claim 1, wherein the phosphazenes comprise phenoxyphosphazenes.

9. The flame-retardant polyamide composition as claimed in claim 1, wherein R$^1$ and R$^2$ in component B) are identical or different and are methyl, ethyl, n-propyl, isopropyl, n-butyl, tert-butyl, n-pentyl, phenyl or a combination thereof.

10. The flame-retardant polyamide composition as claimed in claim 1, wherein R$^3$ in component B) is methylene, ethylene, n-propylene, isopropylene, n-butylene, tert-butylene, n-pentylene, n-octylene, n-dodecylene, phenylene, naphthylene, methylphenylene, ethylphenylene, tert-butylphenylene, methyl-naphthylene, ethyl-naphthylene, tert-butylnaphthylene, phenylmethylene, phenylethylene, phenylpropylene or phenylbutylene.

11. The flame-retardant polyamide composition as claimed in claim 1,
consisting of components A), B), C), D) and optionally E), F) and G).

12. The flame-retardant polyamide composition as claimed in claim 1, wherein the salt of phosphorous acid (component C) is aluminum phosphite Al(H$_2$PO$_3$)$_3$, secondary aluminum phosphite Al$_2$(HPO$_3$)$_3$, aluminum phosphite tetrahydrate Al$_2$(HPO$_3$)$_3$*4aq, aluminum phosphonate, basic aluminum phosphite Al(OH)(H$_2$PO$_3$)$_2$*2aq, Al$_2$(HPO$_3$)$_9$(OH)$_6$(1,6-hexanediamine)$_{0.5}$*12H$_2$O, Al$_2$(HPO$_3$)$_3$*xAl$_2$O$_3$*nH$_2$O with x=1-2.27 and n=1-50, Al$_4$H$_6$P$_{16}$O$_{18}$ or a combination thereof.

13. The flame-retardant polyamide composition as claimed in claim 1, wherein the salt of phosphorous acid is an aluminum phosphite of the formulae (VI), (VII), (VIII) or a combination thereof, wherein
formula (VI) is Al$_2$(HPO$_3$)$_3$x(H$_2$O)$_q$ and
q is 0 to 4;
formula (VII) is Al$_{2.00}$M$_z$(HPO$_3$)$_y$(OH)$_v$x(H$_2$O)$_w$ and
M are alkali metal ions,
z is 0.01 to 1.5,
y is 2.63 to 3.5,
v is 0 to 2, and
w is 0 to 4;
formula (VIII) is Al$_{2.00}$(HPO$_3$)$_u$(H$_2$PO$_3$)$_t$x(H$_2$O)$_s$ and u is 2 to 2.99, t is 2 to 0.01, and s is 0 to 4, or the aluminum phosphite is a mixture of aluminum phosphite of the formula (VI) with sparingly soluble aluminum salts and nitrogen-free foreign ions, mixtures of aluminum phosphite of the formula (VIII) with aluminum salts, mixtures of aluminum phosphites of the formulae (VI) to (VIII) with aluminum phosphite [Al(H$_2$PO$_3$)$_3$], with secondary aluminum phosphite [Al$_2$(HPO$_3$)$_3$], with basic aluminum phosphite [Al(OH)(H$_2$PO$_3$)$_2$*2aq], with aluminum phosphite tetrahydrate [Al$_2$(HPO$_3$)$_3$*4aq], with aluminum phosphonate, with Al$_7$(HPO$_3$)$_9$(OH)$_6$(1,6-hexanediamine)$_{1.5}$*12H$_2$O, with Al$_2$(HPO$_3$)$_3$*xAl$_2$O$_3$*nH$_2$O with x=1-2.27 and n=1-50, with Al$_4$H$_6$P$_{16}$O$_{18}$ or a combination thereof.

14. The flame-retardant polyamide composition as claimed in claim 1, wherein component C) has an average particle size of 0.2 to 100 μm.

15. The flame-retardant polyamide composition as claimed in claim 1, wherein the reinforcing filler or reinforcing agent (component E) comprises glass fibers.

16. The flame-retardant polyamide composition as claimed in claim 1, wherein the phosphonites (component F) are of the formula (IX)

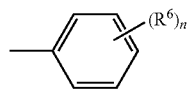    (IX)

wherein

R is a mono- or polyvalent aliphatic, aromatic, or heteroaromatic organic radical and R$^5$ is a compound of the structure (X)

    (X)

or the two radicals R$^5$ form a bridging group of the structure (XI)

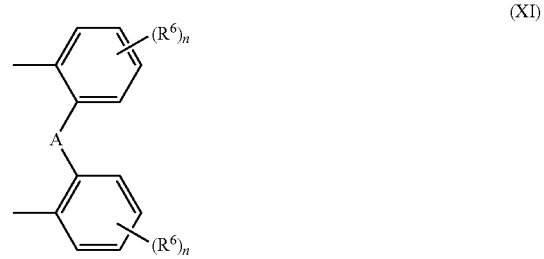    (XI)

wherein

A is a direct bond, O, S, C$_{1-18}$-alkylene (linear or branched) or C$_{1-18}$-alkylidene (linear or branched), and wherein R$^6$ independently at each occurrence is C$_{1-12}$-alkyl (linear or branched), C$_{1-12}$-alkoxy, C$_{5-12}$-cycloalkyl or a combination thereof, n is 0 to 5, and m is 1 to 4.

17. The flame-retardant polyamide composition as claimed in claim 1, wherein component G) is an alkali metal, alkaline earth metal, aluminum and/or zinc salts of long-chain fatty acids having 14 to 40 carbon atoms, reaction products of long-chain fatty acids having 14 to 40 carbon atoms with polyhydric alcohols or a combination thereof.

18. A three-dimensional article comprising the composition as claimed in claim 1, wherein the three dimensional product is selected from the group consisting of moldings, injection-molded parts, extrusion compounds, and extruded parts.

19. An article comprising a flame-retardant polyamide composition as claimed in claim 1, wherein the article is selected from the group consisting of plug connectors, current-contacted components in power distributors (differential-current protection), circuit boards, encapsulating compounds, power plugs, circuit breakers, lamp housings (LED housings), capacitor housings, coil elements and ventilators for grounding contacts, plugs in circuit boards, plugs-on circuit boards, housings for plugs, cables, flexible printed circuit boards, charging cables for cell phones, engine covers and textile coatings.

* * * * *